United States Patent
Müller et al.

(10) Patent No.: US 7,757,731 B2
(45) Date of Patent: Jul. 20, 2010

(54) ADAPTER AS ALTERNATIVE TO FUEL CARTRIDGES

(75) Inventors: Jens Müller, München (DE); Manfred Stefener, München (DE)

(73) Assignee: SFC Smart Fuel Cell AG, Brunnthal-Nord (DE)

( * ) Notice: Subject to any disclaimer, the term of this patent is extended or adjusted under 35 U.S.C. 154(b) by 1287 days.

(21) Appl. No.: 10/510,798

(22) PCT Filed: Mar. 31, 2003

(86) PCT No.: PCT/EP03/03342

§ 371 (c)(1),
(2), (4) Date: Jun. 14, 2005

(87) PCT Pub. No.: WO03/085766

PCT Pub. Date: Oct. 16, 2003

(65) Prior Publication Data

US 2006/0260715 A1 Nov. 23, 2006

(30) Foreign Application Priority Data

Apr. 10, 2002 (EP) ................... 02008035

(51) Int. Cl.
*B65B 1/04* (2006.01)
(52) U.S. Cl. .............. 141/349; 141/346; 141/347; 141/383; 141/386
(58) Field of Classification Search ............ 141/2, 141/18, 67, 98, 346–352, 382–386, 392; 429/30–34
See application file for complete search history.

(56) References Cited

U.S. PATENT DOCUMENTS

| | | | |
|---|---|---|---|
| 3,476,158 A | 11/1969 | Retzler | |
| 4,545,759 A | 10/1985 | Giles et al. | |
| 4,720,259 A | 1/1988 | Day | |
| 5,542,398 A | 8/1996 | Marcon | |
| 6,268,077 B1 | 7/2001 | Kelley et al. | |
| 6,311,723 B1 * | 11/2001 | Shipp et al. | 137/413 |
| 6,326,097 B1 | 12/2001 | Hockaday | |
| 6,924,054 B2 * | 8/2005 | Prasad et al. | 429/34 |
| 7,004,207 B2 * | 2/2006 | Finkelshtain et al. | 141/2 |
| 7,028,724 B2 * | 4/2006 | Cohen et al. | 141/94 |
| 7,318,460 B2 * | 1/2008 | Ohishi | 141/98 |

FOREIGN PATENT DOCUMENTS

| | | |
|---|---|---|
| EP | 0275677 | 7/1988 |
| EP | 0813264 A2 | 12/1997 |
| EP | 1197299 A2 | 4/2002 |
| JP | 06310166 A | 11/1994 |

\* cited by examiner

*Primary Examiner*—Timothy L Maust
(74) *Attorney, Agent, or Firm*—IP Strategies

(57) ABSTRACT

The invention relates to an adapter cartridge for supplying fuel to a device set up for fuel cartridge operation alternatively to the fuel cartridges, also by means of an external tank or an external supply pipe. The adapter cartridge comprises a fuel feed device and an interface on the load side for releasing the fuel, which is formed according to the corresponding interface of the fuel cartridge.

15 Claims, 2 Drawing Sheets

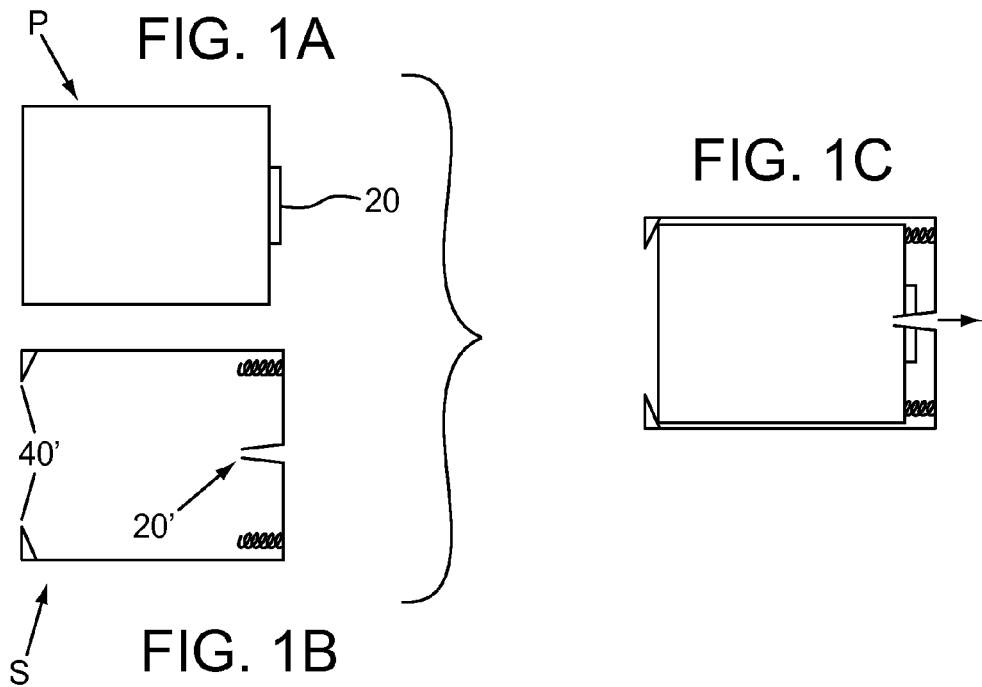
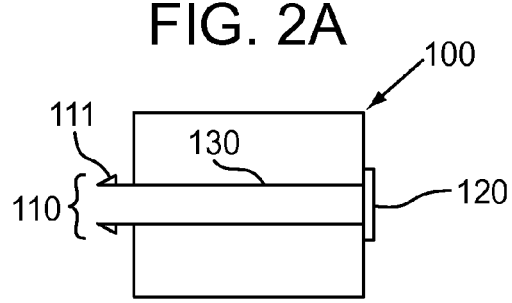
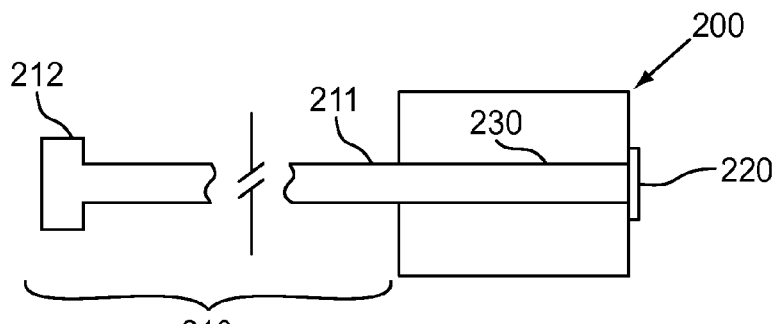

ADAPTER AS ALTERNATIVE TO FUEL CARTRIDGES

FIELD OF THE INVENTION

The invention relates to the extension of possible uses of loads designed for operation with fuel cartridges through the provision of adapter devices.

BACKGROUND OF THE INVENTION

Due to the considerable technical progress within recent years, fuel cells are a serious alternative to non-rechargeable and rechargeable batteries. One of the last advantages of rechargeable and non-rechargeable batteries in mobile fields of use was the user friendliness based on universal availability and easy handling. But the fuel cell technology has also caught up in this field: For example, for supplying fuel to fuel cells, exchangeable single-use or multi-use fuel cartridges are provided, which can be simply handled similar to batteries and which are coupled to cartridge connection devices for connection to the fuel cells (for example, by insertion into a cartridge compartment) and which are equipped with a suitable interface for extracting the fuel. These types of cartridges are described in the European patent application with the application number 200101126949.

Even if the duration of operation of electrical loads can with the use of these types of cartridges exceed by many times that of similar sized batteries, often a running time free of interruption is desired which exceeds the capacity of a cartridge filling ("endless operation"). Furthermore, especially with those devices which are used both in mobile and stationary fields of use, the possible selection between fuel supply by means of a fuel cartridge or a stationary fuel tank would be advantageous.

In view of these aspects, it is an object of the invention to extend the usage potential of devices equipped for fuel cartridge supply and therefore to generally improve the possible uses of fuel cell technology.

BRIEF SUMMARY OF THE INVENTION

The object described above is solved according to the invention by means of the adapter cartridge with the features of claim 1 and the adapter top unit with the features of claim 7. According to these features the adapter cartridge or the adapter top unit can be used instead of a fuel cartridge in order to supply a load with fuel via a fuel supply device (for example a stationary fuel tank).

The adapter cartridge according to the invention for the supply of fuel to a device equipped for fuel cartridge operation comprises a fuel feed device and a user-side interface for the discharge of the fuel, which is formed according to the appropriate interface of the fuel cartridge.

The fuel feed device of the adapter cartridge is already or will be connected to a fuel tank by means of a fuel pipe. This pipe is preferably flexible so that the adapter cartridge is essentially freely movable with respect to the tank with little restriction. The adapter cartridge is inserted into the appropriate device of the fuel-consuming load like a fuel cartridge.

Fuel cartridges have been suggested both for the continuous supply of a load, as well as for refill cartridges for filling an internal fuel tank in the load. The adapter cartridge according to the invention is equally suitable for both of these tasks.

To increase the user friendliness and with regard to handling the adapter cartridge as safe as possible, its housing preferably replicates the housing of the fuel cartridge. This affects particularly such housing parts and housing devices of the fuel cartridge which serve its insertion in a cartridge compartment on the load side and its retention in it. Consequently, devices, which are intended for insertion and/or retention on the load side and/or on the cartridge side, can be used advantageously also with the adapter cartridge.

Although the adapter cartridge can be equipped with a reservoir chamber, in which a certain amount of fuel is temporarily stored, the main purpose of the adapter cartridge is in the formation of a fluid connection between the fuel tank and the fuel-consuming load. Consequently, a particularly simple and therefore preferable further development of the adapter cartridge solely serves the fuel throughput (without storage) and for this purpose is fitted with a fuel passage from the fuel feed device to the interface for the fuel release, also when with this version part of the internal volume of the adapter cartridge remains unused in some circumstances.

The conveyance of the fuel can often occur due to the effect of gravity, overpressure in the fuel tank or a delivery device on the tank side or on the load side. If required, a fuel conveyance device, for example a peristaltic pump or a micropump can be provided in the adapter cartridge.

Depending on the field of use, one of the following two alternative further developments can be advantageous, in which the fuel feed device of the adapter cartridge on the feed side either exhibits a fuel feed pipe formed integrally with the adapter cartridge or comprises a plug-in or screw connection or similar for connection to a correspondingly formed fuel feed pipe.

The adapter top unit, according to the invention, for the fuel supply of a device equipped for fuel cartridge operation comprises a feed-side interface, which is formed for attachment to a fuel supply device, for example a fuel tank or a supply pipe and for the formation of a fluid connection between the adapter top unit and the fuel supply device, as well as an interface for the fuel release, which is formed according to the corresponding interface of the fuel cartridge.

The adapter top unit is permanently connected to the fuel supply device, for example the fuel tank. For drawing fuel the load is placed on the adapter top unit with its interface device and it can be operated in this arrangement.

Preferably, a section of the outer shape of the fuel cartridge housing on the load side is replicated such that an uncomplicated connection to the interface device of the load is possible.

If the fuel tank is not too large and not permanently installed, then a certain amount of mobility is ensured also with this configuration. Particularly suitable is the adapter top unit though for refilling internal fuel tanks in loads, i.e. as an alternative to fuel cartridges used as refill cartridges.

As with the adapter cartridge described above, the adapter top unit can also be formed in a simple and therefore particularly preferred further development with a fuel duct from the interface on the tank side to the interface for the fuel release, i.e. the top unit is not used for (intermediate) storage of the fuel, but rather solely for the fuel flow.

In an advantageous further development the tank-side interface of the adapter top unit comprises an actuating device which, on attaching the adapter top unit onto the fuel tank, opens an outlet valve on the fuel tank. To draw off fuel the appropriate interface of the load only needs to be placed on the adapter top unit.

As already seen in the case of the adapter cartridge, a fuel conveying device, for example a peristaltic pump or a micropump can be provided in the adapter top unit also with such versions of the adapter top unit in which the interior principally or exclusively is used for the fuel throughput.

Similarly, for the solution of the object mentioned above, the invention suggests a fuel supply device which is formed with a connection device for connection to an interface of an adapter top unit on the tank side. In addition or alternatively to this, the fuel tank can exhibit an adapter top unit which is permanently fitted to it.

Furthermore, the invention provides for a fuel supply pipe for the connection of a load to this fuel supply device. The fuel supply pipe comprises an adapter cartridge according to the invention (for the connection of a load), an interface device (for the connection to the fuel supply device), and a (preferably formed to be flexible) fuel pipe. This fuel supply pipe is used to a certain extent as an "extension cable" for the fuel supply.

BRIEF DESCRIPTION OF THE DRAWINGS

Preferred embodiments are described in the following with reference to the enclosed figures.

The following are shown:
FIG. 1A: a fuel cartridge;
FIG. 1B: an interface device on the load side for accommodating the fuel cartridge of FIG. 1A;
FIG. 1C: the fuel cartridge of FIG. 1A inserted into the interface device of FIG. 1B on the load side;
FIG. 2A: a first preferred embodiment of the adapter cartridge according to the invention;
FIG. 2B: a second preferred embodiment of the adapter cartridge according to the invention.

DETAILED DESCRIPTION OF THE INVENTION

Figure 3A:
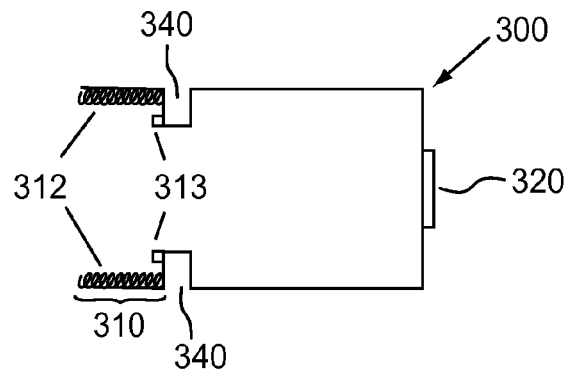
FIG. 3A: a preferred embodiment of the adapter top unit according to the invention.

The FIGS. 1A-1C illustrate a fuel cartridge P, an interface device S on the load side for the accommodation of the fuel cartridge P and both in combination.

The fuel cartridge P and the interface device S on the load side are matched to one another and preferably formed such that the cartridge P latches into the interface device S when introduced into it and the interface 20 for drawing off the fuel during the insertion stage using a complementary device 20' of the interface device S is opened. With regard to the details reference is made to the European patent application with the application number 200101126949.

FIG. 2A shows a first preferred embodiment of an adapter cartridge 100 which is formed for alternative use instead of the fuel cartridge P of FIG. 1A. Regarding the outer shape, it only differs from the fuel cartridge P by the fuel feed device 110, which for example can be formed as a plug-in coupling connection 111.

The embodiment of FIG. 2A is provided with a fuel duct 130 which connects the fuel feed device 110 to the fuel extraction interface 210. (Alternatively to this, the complete internal space of the adapter cartridge 100 can be used for the fuel duct or partly for intermediate storage.) With the exception of this duct 130 the interior of the adapter 100 has no functional significance with this embodiment. The adapter cartridge 100 is simply inserted into the interface device S of the load just like the fuel cartridge P. The outer shape, which is essentially identical to the cartridge P, is practicable so that the elements provided for the guidance and secure mounting also have a function when the adapter cartridge 100 is used. Provided this function is ensured, deviations in the outer form are also possible.

Both the fuel feed device 110 and the interface 120 can be provided with (non-return) valves which ensure secure connections and enable the adapter to be fitted and removed while preventing fluid from leaking.

FIG. 2B shows an alternative adapter cartridge 200, whose feed side 210 exhibits a permanently provided fuel pipe 211. The other end of the pipe exhibits a connection piece 212, which for example can be a conventional plug-in coupling piece. This connection piece 212 is connected to a fuel tank or a supply pipe. Further details of the adapter largely correspond to those of the embodiment of FIG. 2A and its description does not need to be repeated. In connection with the following described FIG. 3 and the fuel supply pipe according to the invention, it should first be noted that the end 212 on the supply side of the adapter 200 can essentially be formed as the interface device S sketched in FIG. 1B, so that this embodiment can be used as a fuel feed extension pipe.

FIG. 3A is a schematic illustration of a preferred embodiment of the adapter top unit 300 according to the invention. It exhibits an interface 310 on the tank side, which for example exhibits a screw thread 312 for permanent connection to a fuel tank T (or alternatively for the connection to a supply pipe).

The section of the adapter top unit 300 on the load side exhibits an interface 320, which is formed as the above described interfaces 120, 220 of the adapter cartridges 100, 200 analogous to the interface 20 of the fuel cartridge P which is to be substituted. Furthermore, this section is formed such that it facilitates a simple connection to the interface device S. For this purpose notches 340 are for example provided in the housing, with which the retaining pins 40' of the interface device S can engage.

Figure 3B:
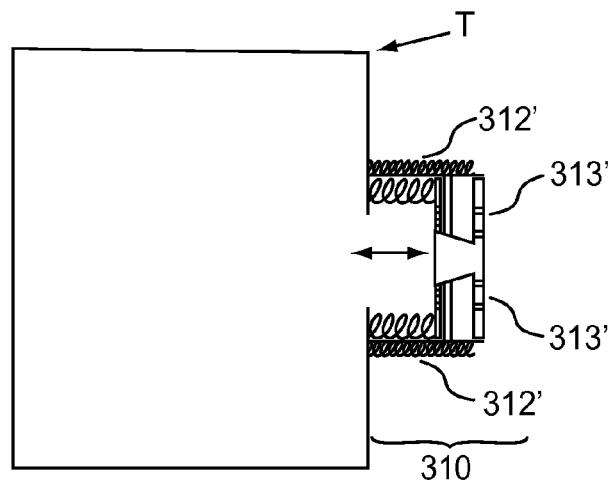
FIG. 3B: a fuel tank with a connection device for the connection to the interface of the adapter top unit of FIG. 3A on the tank side.

An interface 310', formed for connection to the interface 310 of the top unit 300, is sketched in FIG. 3B. This is provided on a fuel tank T and exhibits an outer thread 312' in order to facilitate the mechanical joint to the corresponding thread 312 of the top unit. Instead of a screwed joint, other reversible joining devices are also possible.

To establish a fluid connection between the tank T and the top unit 300, the interface 310' of the tank T can exhibit for example a disc valve 313' which is opened by a corresponding actuating device 313 of the top unit. In the sketched embodiment the actuating device 313 is a rigid device, so that the opening occurs automatically on making the connection. If desired, the actuating device can however be formed such that it makes the fluid connection only after separate (mechanical, electrical or magnetic) activation. It need not in this case be provided on the side of the top unit 300, but instead it can just as well be integrated into the interface 310'.

Figure 3C:
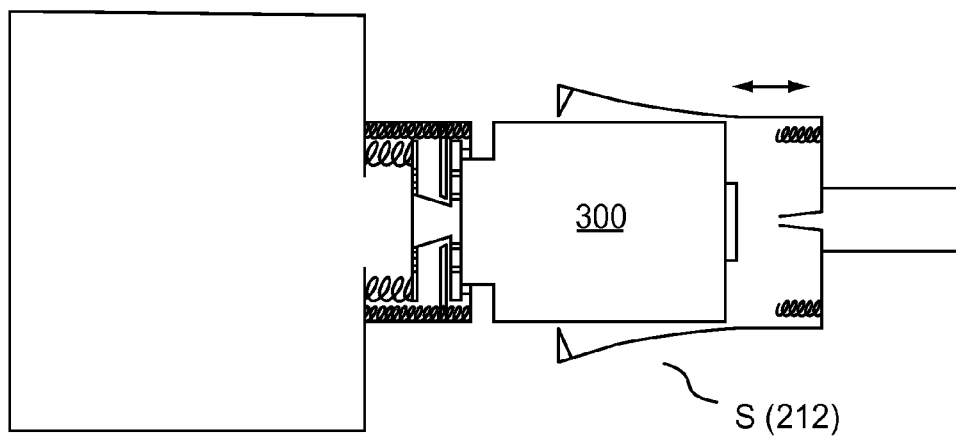
FIG. 3C: the fuel tank of FIG. 3B in fluid connection with the adapter top unit of FIG. 3A.

FIG. 3C shows the top unit of FIG. 3A, which is placed on the tank T of FIG. 3B, so that a fluid connection is established. In this case it is assumed for the sake of simplicity that the tank T is subject to a pressure and consequently the interior of the top unit 300 is filled with the fuel under pressure.

The fuel supply of a load designed for cartridge operation can now occur by placing the interface S of the load onto the top unit 300. If the load has an internal fuel tank, then it can be filled in this way. If this is not the case, then the operation of the load is possible in the placed-on state. Another, particularly advantageous possible use of the invention is when the device of FIG. 2B is formed with an interface 212 corresponding to the interface device S and this device is used as the fuel feed extension pipe, which facilitates a certain degree of mobility when using the load.

The invention claimed is:

1. Fuel supply pipe assembly for the connection of a load to a fuel supply device, comprising:
   an adapter cartridge for supplying fuel to a device set up for fuel cartridge operation, which includes a fuel feed device adapted to connect the adapter cartridge to a fuel supply device, and an interface on a load side for discharging the fuel, which is formed according to a corresponding interface of the fuel cartridge;
   an interface device; and
   a fuel pipe;
   wherein the supply device includes at least one connection device for connection to the interface on the supply side of an adapter top unit for supplying fuel to a device set up for fuel cartridge operation; and
   wherein the adapter top unit includes a feed-side interface, which is formed for attachment to a fuel supply device and for the formation of a fluid connection between the adapter top unit and the fuel supply device, and an interface for discharging the fuel, which is formed according to the corresponding interface of the fuel cartridge.

2. Fuel supply pipe assembly according to claim 1, wherein the adapter cartridge includes a housing which replicates a fuel cartridge housing.

3. Fuel supply pipe assembly according to claim 1, wherein the adapter cartridge includes a fuel duct from the fuel feed device to the interface for the fuel release.

4. Fuel supply pipe assembly according to claim 1, wherein the adapter cartridge includes a fuel conveyance device.

5. Fuel supply pipe assembly according to claim 1, in which the fuel feed device comprises a fuel pipe.

6. Fuel supply pipe assembly according to claim 1, in which the fuel feed device comprises a connection for a fuel feed pipe.

7. Fuel supply pipe assembly according to claim 2, wherein the adapter cartridge includes a fuel duct from the fuel feed device to the interface for the fuel release.

8. Fuel supply pipe assembly according to claim 2, wherein the housing does not enclose a fuel cartridge.

9. Fuel supply pipe assembly according to claim 8, wherein the housing replaces a fuel cartridge with respect to a load device.

10. Fuel supply pipe assembly according to claim 9, wherein the fuel feed device is adapted to connect the adapter cartridge to an external fuel source in place of the fuel cartridge.

11. Fuel supply pipe assembly according to claim 1, wherein the fuel feed device is adapted to connect the adapter cartridge to an external fuel source in place of a fuel cartridge or fuel cell.

12. Fuel supply pipe assembly according to claim 1, wherein the interface is adapted to couple the fuel feed device to the load in place of a fuel cartridge or fuel cell.

13. Fuel supply pipe assembly according to claim 1, wherein the fuel feed device is adapted to connect the adapter cartridge to a stationary fuel source.

14. Fuel supply pipe assembly according to claim 13, wherein the interface is adapted to couple supply fuel from the stationary fuel source to a mobile load device.

15. Fuel supply pipe assembly for the connection of a load to a fuel supply device, comprising:
   an adapter cartridge for supplying fuel to a device set up for fuel cartridge operation, which includes a fuel feed device adapted to connect the adapter cartridge to a fuel supply device, an interface on a load side for discharging the fuel, which is formed according to a corresponding interface of the fuel cartridge, and a fuel duct from the fuel feed device to the interface for the fuel release;
   an interface device and
   a fuel pipe;
   wherein the supply device includes at least one connection device for connection to the interface on the supply side of an adapter top unit for supplying fuel to a device set up for fuel cartridge operation; and
   wherein the adapter top unit includes a feed-side interface, which is formed for attachment to a fuel supply device and for the formation of a fluid connection between the adapter top unit and the fuel supply device, and an interface for discharging the fuel, which is formed according to the corresponding interface of the fuel cartridge.

* * * * *